United States Patent [19]

Pertl et al.

[11] Patent Number: 4,943,158
[45] Date of Patent: Jul. 24, 1990

[54] SENSOR CONTROLLED LEVELING DEVICE

[75] Inventors: Peter Pertl, Tulpenstr. 3, D-8200 Rosenheim; Uwe Knauss, Prien, both of Fed. Rep. of Germany

[73] Assignee: Peter Pertl, Rosenheim, Fed. Rep. of Germany

[21] Appl. No.: 123,525

[22] Filed: Nov. 20, 1987

[30] Foreign Application Priority Data

Nov. 21, 1986 [DE] Fed. Rep. of Germany ....... 3639770

[51] Int. Cl.⁵ .................. G01C 3/08; G01B 11/26; E02F 3/76
[52] U.S. Cl. ......................... 356/4; 33/366; 33/377; 33/378; 172/4.5; 340/689; 356/152; 356/400
[58] Field of Search .............. 33/366, 377, 378; 172/4.5; 340/689; 356/400, 152, 4

[56] References Cited

U.S. PATENT DOCUMENTS

| | | | |
|---|---|---|---|
| 3,242,340 | 3/1966 | Layne | 172/4.5 |
| 3,564,531 | 2/1971 | Burgin | 33/366 |
| 3,640,628 | 2/1972 | Jones | 356/4 |
| 3,660,840 | 5/1972 | Plofchan . | |
| 4,200,787 | 4/1980 | Carson | 250/227 |
| 4,273,196 | 6/1981 | Etsusaki et al. | 175/4.5 |
| 4,677,555 | 6/1987 | Goyet | 356/1 |

FOREIGN PATENT DOCUMENTS 3200545 7/1985 Fed. Rep. of Germany .

OTHER PUBLICATIONS

Laser-Nivelliersysteme fur Baumaschinen-steuerung-"Laser-Steuersystem im Einsatz fur grobflachige Erdarbeiten"-SPECTRA-PHYSICS GmbH-31 Jahrgang, Sep./Oct. 1980-pp. 148-150.
Baumaschinen-Steuerungssystem garantiert Genauigket und lost die Personalfrage Rationalisierung beim Sportplatzbau, 16-18.
Beschleunkgeb Ofkabzebfette das Altern-UMSCHAU72 (1972), Helt 20, pp. 664-665.

Primary Examiner—Stephen C. Buczinski
Attorney, Agent, or Firm—Nixon & Vanderhye

[57] ABSTRACT

A sensor controlled leveling device comprises an attitude detector and/or a laser sensor. In order to create a sensor controlled leveling device with which a desired relative attitude may be automatically set and held the attitude detector has a float which is supported and pivoted in a central part. The laser sensor comprises a zero point recognition means whose output is connected with electronic processing circuitry for at least one servo drive. Using the control unit it is possible for the drive to be operated in a direction opposing a relative change in setting of the laser sensor in relation to a reference plane as swept out by a laser generator so as to correct deviation of the laser sensor from the reference plane.

16 Claims, 5 Drawing Sheets

SENSOR CONTROLLED LEVELING DEVICE

BACKGROUND OF THE INVENTION

The invention relates to a sensor controlled leveling device comprising a laser sensor for detecting a datum plane in relation to a reference plane established by a laser beam and electronic processing means, via which at least one servo drive connected with the sensor is shifted to oppose a change in the relative attitude of the laser sensor in relation to the reference plane in order to produce a correction of deviation of the sensor towards the reference plane.

In accordance with another aspect the invention relates to a leveling device comprising an attitude detector with a container, a liquid located in said container and a float therein, and two cooperating pairs of contacts for detecting a change in attitude of the float and for actuating a servo drive whose input is connected with the pairs of contacts for automatic correction of deviation, the two pairs of contacts being so placed oppositely at the end parts of the float that in each case one contact member of each contact pair is on the float and the respective other contact member is supported on the housing.

In many engineering applications precise apparatus for leveling is becoming of increasing importance. Such equipment is intended not only for measuring and detecting certain horizontal or angular settings but also for producing a correction of deviations, for example to keep a machine in alignment.

A detector device for detecting the oblique setting of a machine frame is described for example in the German examined specification 3,200,545.

This detector device comprises a container which is secured to the frame of a machine and is filled with a liquid in which there is a float which is so designed that the upthrust of the float is less when the liquid is at an angle owing to an oblique setting of the machine frame and the float is subject to less frequent or less severe changes in comparison with the weight of the float so that less frequent or reduced alterations are involved. There is furthermore a device for indicating or detecting the obliquity of the float which consists of two contact sensors which are arranged at the ends of the longitudinally extending float and cooperate with further contacts.

The U.S. Pat. No. 3,660,840 describes a level indicating device which also has a float above which four contacts are arranged in the form of a cross and are mounted on a plate forming part of the device. The float bears against a central screw on the cover of the device so that a bearing or support point is formed about which the float pivots. The device is however only used to indicate, for example, the angle of camping vehicle. While the initially mentioned prior art device with the leveling means is often completely unsuitable for many applications, since evaporation or the like will cause a change in the level of the liquid so that accurate leveling will be impossible and thus such a device may only be used for very coarse work in which the attitude or orientation of something is detected with a large degree of approximation with automatic adjustment in the opposite direction to a deviation, as for example on a constructional machine, the second prior art device suffers from the disadvantage that its attitude detecting device is only able to be used for indicating and not for automatic correction of deviations, for example on constructional machines. Furthermore the detector device may only be used for the adjustment of a horizontal attitude and not for use in connection with predètermined and presettable angular settings.

In practice there is frequently not only the problem of working the soil along a horizontal path or along a plane descending or ascending at a given angle, but also of leveling the ground at a certain selectable height.

In the prior art a reference plane for the height of leveling of the soil may be defined by a taut cord or a wire held between two points. However, more especially in the case of heavy earth moving machines there are likely to be serious inaccuracies.

Accordingly lasers have already been proposed for the alignment of constructional machinery. The laser is used to define a reference plane. A laser sensor is then mounted on an earth moving machine for instance. The laser sensor may then so operate a hydraulic system that the center of the receiver or sensor continually follows the laser beam. If the laser sensor drifts together with the earth moving machine upwards this will be detected by the laser sensor and the earth moving machine with the laser receiver mounted thereon will be moved downwards to correct the deviation and the laser receiver is returned to the reference plane as defined by the laser beam source unit so as to be exactly in the centered state. Laser sensors so far proposed are however not only very high in price but more especially have the disadvantage that they only make it possible to attain a continuous alignment of the laser sensor in relation to the reference plane as defined by the laser beam with substantial error fluctuations.

SHORT SUMMARY OF THE INVENTION

Accordingly one object of the present invention is to devise a sensor controlled leveling device, more especially for constructional machinery, with the aid of which deviations from a desired relative attitude may be detected.

A further aim of the invention is to provide such a device with servo drives for correcting such deviation.

In order to achieve these or other objects appearing from the present specification and claims in one form of the device the laser sensor defines a fine sensor range with two prisms placed symmetrically in relation to the datum plane so that their conically tapering parts are pointed towards each other so as to end in the immediate vicinity of each other and having a photodetector arranged at least indirectly on the basis of the respective prism, the processing electronic circuitry comprising a comparator circuit making it possible for at least one servo drive to be operated in response to differing light incidence intensity at the two prisms until the laser beam defining the reference signal plane and to be received is between the two converging points of the tapering prisms.

In accordance with a further aspect the float is supported at its center part by a center support and is rotatably bearinged in the transverse direction with respect to the respectively vertical connecting plane between the two pairs of contacts and an adjustment device is present which makes it possible for the respective one contact members to be set in order to produce a preselectable inclined reference plane at a preselectable angle to the horizontal.

Advantageous further developments of the invention are described in the dependent claims.

The laser sensor in keeping with the invention is characterized by an extremely high degree of precision and is simple to construct so that as compared with the prior art devices it is very cheap to manufacture. This is possible in the invention inasfar as there are two cones directed towards each other with photodetectors to receive light from them so that if there is any deviation of the incoming light beam from the center reference plane the light intensity incident at the one cone will at once differ from the light intensity to be detected at the photodetector associated with the second cone. In accordance with a further development of the invention leading to simplification an improvement is possible involving the use of a frustoconical converging lens or concentrator to receive light from the cone means to make it possible to employ photodetectors with smaller dimensions, same being obtainable at a lower price.

The cones described which are so arranged that they are symmetrical in relation to the central datum plane pointing towards each other leads to an extremely precise fine sensor range. In order to ensure the largest possible reception range for the laser sensor while making possible low-price constructional features, there is also a so-called coarse sensor range comprising adjacently placed partly or completely cylindrical converging lenses with photoelectric detectors arranged behind them.

This coarse sensor range is symmetrically arranged on both sides of the center datum plane.

In order to ensure that, for instance in the case of constructional machine, the machine may work the soil automatically in a desired horizontal or inclined plane there is furthermore an attitude detector by means of which, for instance, the soil working head or other device of the constructional machine is maintained in a horizontal or in an inclined attitude at the precisely preset angle. The leveling device with the attitude detector then comprises a float with contact sensors. In order in this case to make possible exact automatic control it is important that the float bear upon a clearly defined support point. More especially owing the setting device, which is also provided, it is then possible to preset any desired upwardly or downwardly inclined angular settings in relation to the horizontal so that the attitude detector makes it possible for deviations from the preset angular setting to be detected at any time and for suitable servo drives to produce a correcting action.

It is furthermore more particularly possible in connection with the laser sensor in accordance with the invention to define a basic plane, as planned in advance, by the use of a laser generator, the laser receiver, designed to receive a beam coming in from any direction in a given plane, operating a control device and a servo drive connected therewith in order to maintain the constructional machine at a preset height all the time. It is more especially when the laser sensor is mounted on the attitude detector or is so arranged as to pivot therewith that it is not only possible to ensure that the soil working machine is automatically vertically aligned with the reference plane as defined by a laser and received by the laser sensor, but furthermore any automatic adaptation of a soil working device on the machine or a working head thereof will be kept at the desired angular setting.

Since furthermore the presettable reference plane produced by the laser generator may be selected it is possible to ensure that there is an automatic correction of deviations, for instance when working on slopes. In other words it is possible for a soil working machine or earth moving machine to even out a slope in an entirely automatic manner, since the angular setting, when once established, may be adhered to using the attitude detector and the leveling height with the aid of the laser sensor, which recognizes the reference plane as established by the laser generator.

Further advantages, details and features of the invention will be seen from the detailed account of working examples of the invention as shown in the accompanying drawings.

LIST OF THE SEVERAL FIGURES OF THE DRAWINGS

FIG. 3b is a plan view of part of the arranged with the float and the contact device of the embodiment shown in FIG. 3a.

DETAILED DESCRIPTION OF WORKING EXAMPLES OF THE INVENTION

Figure 1:
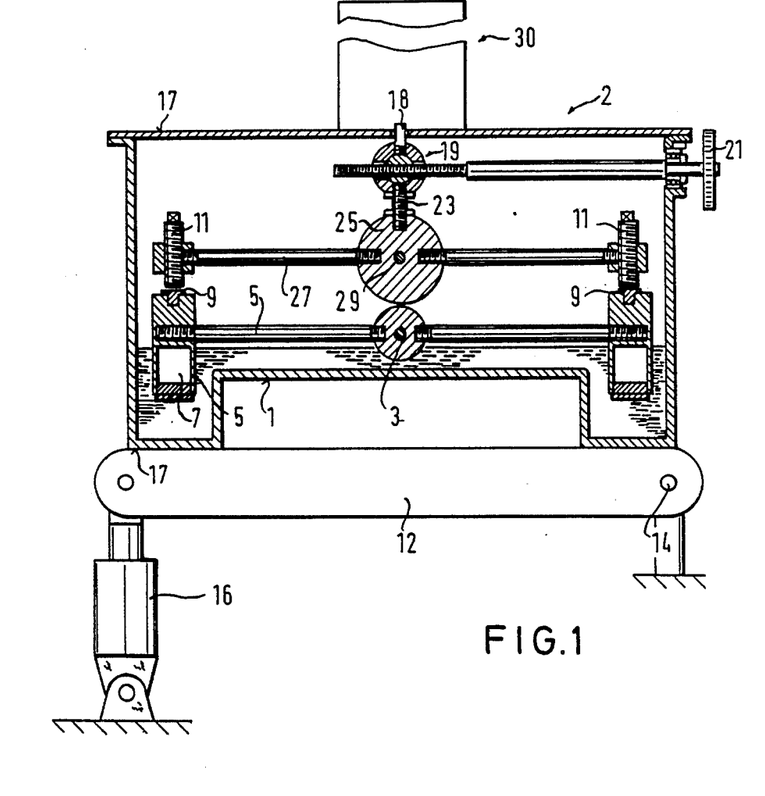
FIG. 1 is a diagrammatic vertical section taken through a first working embodiment of the invention with an attitude detector in accordance with the invention and a laser sensor in accordance with the invention mounted thereon.
Figure 2:
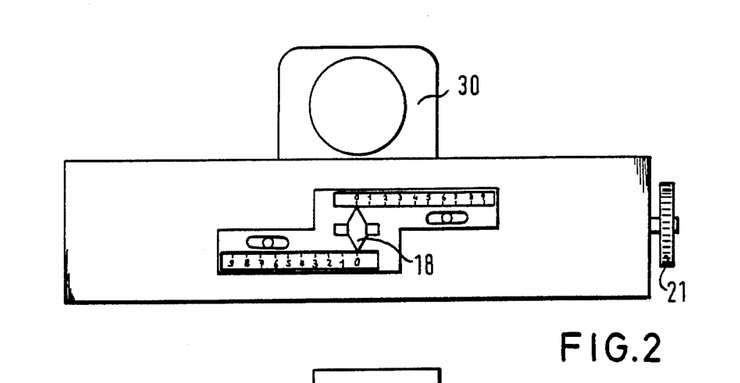
FIG. 2 is a diagrammatic plan view of the working example as shown in FIG. 1.

In what follows reference will initially be had to FIGS. 1 and 2 in which a first working example of the invention is to be seen.

In FIG. 1 an attitude detector 2 having a container 1 comprises a float 5 with float chambers 7 pivoting about a center support 3 in a liquid about an axis. In this working example the center support 3 is for example formed by a horizontal pin extending transversely in relation to the float 5. The liquid itself may for instance a viscous one in order to damp the effect of vibrations on the float. At its ends the float 5 is provided with means for detecting an oblique setting of the float. These means in each respective case consist of a pair of contact members 9 and 11. In the present working example of the invention the contacts or contact members 9 are provided on the float 5 on its upper part adjacent to its opposite ends.

These contact members cooperate with suitably arranged second contact members, which in the illustrated working example of the invention may consist of contact sensors 11 and which on touching the contact members 9 respectively provided on the float 5 produce a switching action electrically or, for instance in the case of magnetic sensors, owing to the proximity to the contact members 9. In the case of electrical switches the contact sensors 11 of the float 5 will themselves be connected with the one pole of a power supply so that on touching the respectively other contact member 9 on the float a respective servo drive 16 will be operated, which in the illustrated working example is in the form of a hydraulic cylinder actuator.

The servo drive 16 then, for instance, so lifts or lowers the boom 12 of a constructional machine about the horizontal pivot axis 14 that the contact pair 9 and 11 is moved back into its neutral setting in which contact between them is interrupted and the servo drive actuators are switched off.

When the contact sensors 11 are set in a precisely horizontal attitude, deviation correction is automatically performed in all cases until a reference plane 17 defined at the container 1 is exactly parallel to the contact plane of the contact sensors of the contact members 9. The leveling device is arranged at the said reference plane 17 on the constructional machine, for instance in the present case on the boom 12 of the constructional machine. It is naturally also possible for vertically adjustable servo drives to be arranged on the lower side of the container directly over the soil for correcting deviations of the container. In this respect FIG. 1 is only intended to show the design in principle. As a rule the attitude detector 2 is mounted on a boom 12 of a traveling constructional machine.

The leveling device described is however also designed so that it may set any desired angle. For this reason there is an adjusting device 19 which is operated using a right hand setting wheel 21. At the end of the shaft of the adjusting device 19 a shaft support 25 of a setting beam 27 is so moved via a transverse strut 23 that the setting beam 27 is moved about an axis 29 parallel to the center support 3 in a clockwise or counter-clockwise direction with reference to FIG. 1 so that upper contact members 11 arranged outwardly on the setting beam 27 are lowered, for example, to the left and raised to the right. On suitably turning the setting wheel 21 in the opposite direction the upper contact members of contact sensors 11 are adjusted in the opposite direction.

This makes it possible, for example by turning the setting beam 27 in the clockwise direction, for the right hand upper contact member or the contact sensor 11, respectively, to be put into contact with the contact member 9 on the float 5 so that the latter is pressed against the upthrust force further into the liquid. Since contact has now been made the servo drive 16 is so operated that the boom 12 and accordingly the container 1 is lowered to the left (in terms of FIG. 1). This lowering operation is continued until so much liquid has flowed from the right to the left in the container 1 that the float will have resumed its natural level attitude as a result of the gravitational and upthrust forces acting on it. In this attitude or orientation the contact means are in the switched off setting so that the said servo drive 16 is switched off again. In other words, the servo drive 16 is switched off at precisely that point in time at which the setting beam 27, which is intentionally set at an angle to the container 1, has reverted to its attitude in which it is precisely parallel and horizontal in relation to the surface of the liquid.

Because this is so the container and the reference plane are exactly in the reproducible, set angular position. The angle set may, as is shown in FIG. 2, be read off from the indicating means 18 as seen from above.

Furthermore the apparatus includes a laser sensor on the top of the container which receives a beam from all directions and which makes it possible to set a desired attitude in relation to a reference plane as swept out by a laser beam and for any deviation from this attitude to be automatically corrected. More details of this feature will be given below.

This embodimemt of the invention described makes it possible to carry out leveling around a pivot axis 14 along a straight line.

Figure 3A:
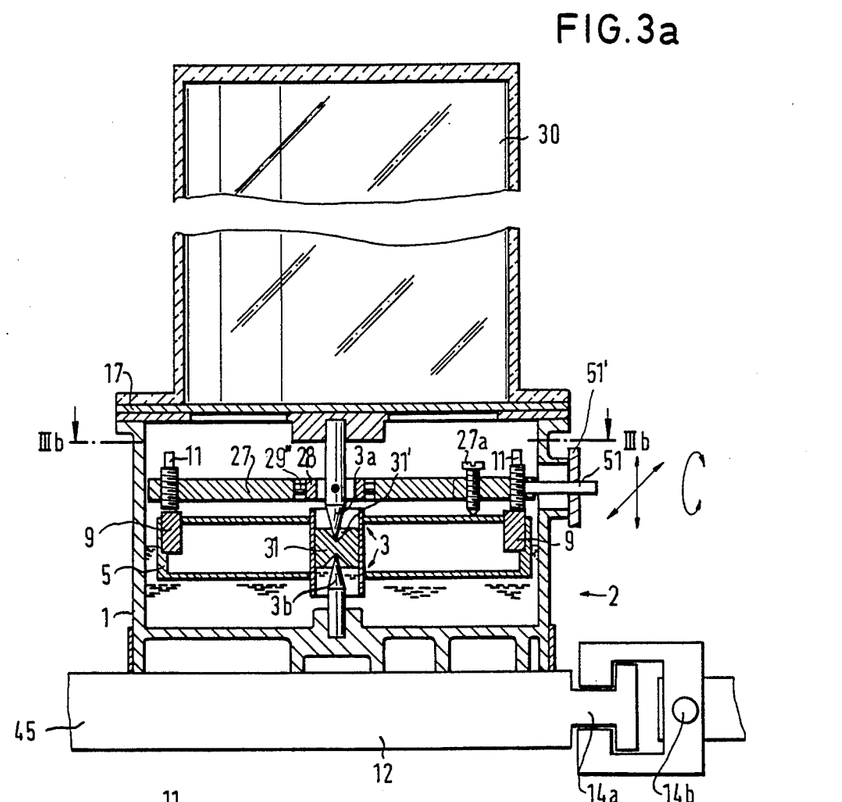
FIG. 3a is a vertical section taken through a second working embodiment in a diagrammatic representation.
Figure 3B:
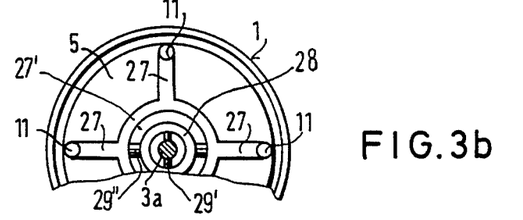

Using the working example shown in FIGS. 3a and 3b it is furthermore possible to perform leveling along a plane, parts of the apparatus which correspond to parts in the embodiment shown in FIGS. 1 and 2 being indicated by like reference numerals.

In this form of the invention the float 5 is of circular construction and has contact members or contact zones 9 arranged in pairs with a respective offset of 90° so as to be able to cooperate with overlying contact members or contact sensors 11 placed in the form of a cross and which in FIG. 3b will be seen to be mounted on adjusting carriers 27 placed in the form of a cross. The float 5 is also precisely via a central support 3 in the form of a pin in order to achieve accurately reproducible readings. The central support or the pin 3a is in constant contact with the float 5 so that owing to the upthrust forces the float 5 bears thereagainst.

For this purpose the float 5 has a conical receiving member 31 thereon which is able to be adjusted vertically in a sleeve using a screw thread. Furthermore, the pin 3a, which serves as the central support 3, is able to be adjusted vertically in the cover of the housing using a screw thread so that fine setting is possible.

The concave recess 31' is in this respect set at such a level that its lowest point, in which the tip of the pin 3a makes contact, is in the center of gravity of the float.

In certain applications it may be possible to use a lower pin 3b in place of the pin 3a as well, if the float is to be arranged therein like the beam of a scales so that the center of gravity of the float assumes a position under the central support. Then the tip of the lower pin 3b is be precisely at the center of gravity of the float. The respectively opposite pin 3a or 3b, which fits into a second concave and conical recess 31', opposite to the first recess, is then so adjusted that it ends clear of the conical receiving member 31, and without contacting it, and only serves as a retainer. This clearance is so small that it is not able to be indicated in FIG. 3a. The clearance does however not hinder the pivoting motion of the float.

Departing from the embodiments so far shown in FIGS. 1 through 3 it is also possible to have sensors 11 in the form of contactless analog switches, in which case for each pair of contact sensors 11 pivoting about an axis it is possible to have a single analog switch to be attached to one side of the pivot pin so as to detect a relative change in the distance between the analog switch and the float out of a preset zero point setting and to provide a respective signal for causing deviation correction. Furthermore it is possible to limit oscillation and to cause a damping effect by screwing a distance setting screw 27a, shown for example in FIG. 3 in the setting beam 27 on one end of the center support 3. This screw 27a limits motion of the analog switch placed only on this side of the setting beam 27. The pivoting float may in this respect even be set to a value as little as 1/10 mm, that is to say so that the float may only pivot past the zero point setting by 1/10 mm to one side. On the other side there is no analog switch and furthermore no limiting means. Thus in order to ensure setting to a horizontal attitude it is only necessary to have two separate analog switches in place of two pairs of contact sensors 11.

This adjusting device is more especially suitable for certain moving objects, particularly good results being achieved when the float is in a low viscosity liquid rather than a viscous one.

For certain cases the support 3 for the float 5 may particularly satisfactory if the there is a ball joint or a hooke's joint.

Owing to the manner of supporting the float in the liquid as indicated in the example the latter may be pivoted about axes, which are perpendicular to each other, in accordance with the attitude or angle of the container 1. In this working example of the invention it is possible for the boom 12, for instance the boom of an item of constructional machinery, to be floatingly pivoted about two axes 14a and 14b, which are perpendicular to each other, out of the horizontal plane. For the two axes 14 and 14b there are respective servo drives, such as the servo drive 16 as shown in principle in FIG. 1. As soon as the boom 12 is pivoted out of the set leveling attitude it is possible for one or, for instance, two pairs of contacts to produce a pulse in accordance with the direction of deviation so that the one servo drive or both of them are operated, possibly for differnt times until the respective axes 14a and 14b are so reset that the boom 12 and thus the attitude detector 2 is back in its set attitude.

In this form of the invention as well it is possible to have a setting beam 27 in the form of a cross or also in the form of a plate which by operation of one laterally projecting actuating end 51 is brought into a given angular setting so that one or two adjacently placed contact sensors 11 cooperate with the contacts 9 and operate the respectively associated drives 14a and 14b until the setting beam 27 has returned to a level attitude and thus the reference plane 17 is back in the set angular attitude in relation to the horizontal. For this purpose the setting beam 27 is held on the housing 1 by way of the pin 3a or more exactly by way of a first adjustment pin 29', attached to the pin 3a. At the free ends of the pin 29' there is a ring 28 placed around the pin 3a with a sufficient clearance and from which a second pin 29" extends at an offset angle of 90° and on which the setting beam 27 is rotatably mounted. At its center the cruciform setting beam 27 thus has an annular section 27' carrying its individual arms. This creates a cruciform articulated mounting means.

By raising or lowering the actuating end 51 it is thus possible to adjust about the pin 28 and by turning the same end 51 about its axis there is the possibility of adjustment about the axis 30, simultaneous adjustment about the two axes also being possible. In order to hold the arrangement in a preset angular position there is a locking wheel 51' able to turn on the actuating end 51 so that if this wheel is turned it makes frictional contact with the housing and thus locks the system in the desired angular setting.

Figure 4:
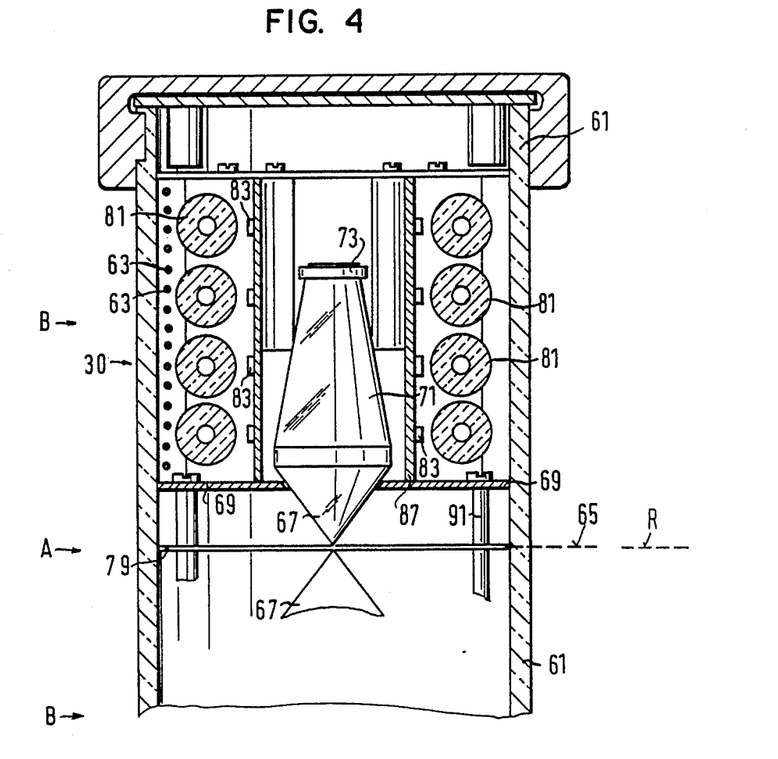
FIG. 4 is a partial vertical section of the laser sensor.
Figure 5:
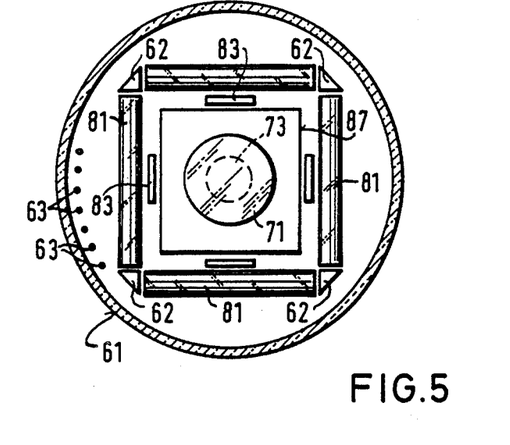
FIG. 5 is a plan view of the laser sensor in accordance with FIG. 4.
Figure 6:
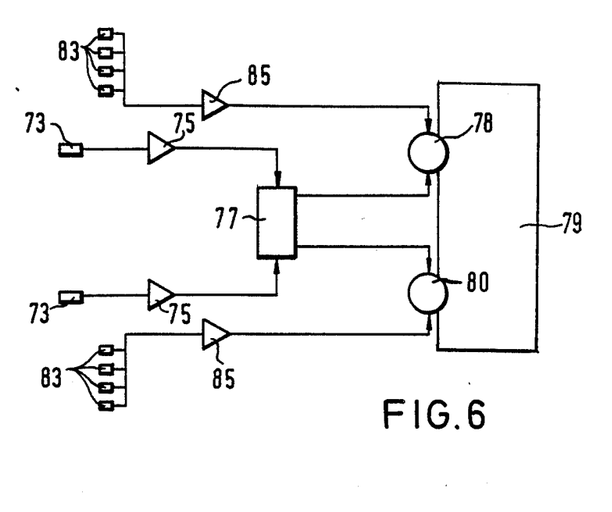
FIG. 6 is a schematic of the circuitry.

With reference to FIGS. 4 to 6 a more detailed account will be given of the laser sensor already mentioned in connection with FIGS. 1 through 3.

Figure 4A:
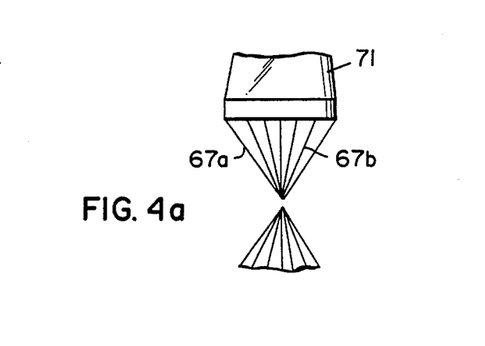
FIG. 4a is a fragmentary, side elevational view of a polygonally shaped prisms.

The laser sensor 30 is of a type which is able to receive a laser beam from any direction in a plane and comprises a glass enclosure 61 with a rear circularly extending gauze shield 63 to keep out obliquely incident light. The laser sensor is designed to be symmetrical in relation to the center datum plane 65 thereof and comprises two conical or polygonal prisms 67 (or more exactly tapering blocks arranged to converge towards each other) which each extend through a metal plate 69. A prism 67a FIG. 4a is polygonal in shape and has multiple facets 676. The two opposite metal plates 69 parallel to the datum plane 65 define the so-called fine sensor range A. The gauze shield 63 is only shown in FIG. 4 in the left hand sectioned part thereof.

On the base surface of each conical prism there is a respective frustoconical prism tapering towards the rear to act as a collecting lens or concentrator 71, at whose end there is a light sensing means in the form of a photodetector 73.

A rotating laser generator, which is not shown, sweeps out the datum plane R, i.e. defines it which is for instance horizontal. If the laser beam from the light generator is incident in the fine sensor range A the laser beam will be incident on the upper or the lower prism above or below the datum plane 65 in accordance with the angle of incidence. The index of refraction of the glass of the prisms is so selected that incident light parallel to the leveling plane 65 is reflected at the outer face of the prism, preferably through approximately 90°. The collecting lens 71 makes it possible to use a photodetector 73 with a small surface size, this representing a substantial saving in costs.

The light signal received by way of the photodetector 73 is thus converted into a current signal and fed to an amplifier 75 shown in FIG. 6 followed by a comparator 77, whose output signal is fed to a control input 78 or, respectively, 80 for causing a raising or lowering action of a servo drive 79.

If now for example the laser beam to be received is only incident on the upper prism, because the constructional machine carrying the laser sensor is too low down, the drive 79 is operated for upward motion until the laser beam is exactly between the tips of the two conical converging prisms 67 and the comparator 77 provides an output signal for "equal intensity at the two photodetectors 73", which causes the drive to be turned off. If the laser beam is only incident at the lower conical prism 67 and is more especially acts on it with a greater intensity, the servo drive 79 is operated via the comparator 77 in the opposite or "lowering" direction until the reference plane R, that is to say the plane swept out by the laser generator, runs again exactly between the tips or through the tips of the prisms 67.

On achieving a vertical alignment of the laser sensor 30 the datum plane 65 and the reference plane R will coincide.

It has furthermore been found to be an advantage if there is an extremely thin opaque sheet 79 between the two conical prisms 67.

If the laser beam to be received should be incident on the laser sensor outside the fine sensor range A, it may then be incident in a further, coarse sensor range B. The latter is defined in the illustrated working example of the invention between superposed, parallel cylindrical lenses 81, which are mounted in four paths adjacent to each other within the glass enclosure 61 on a support 62, as will be seen from FIG. 5. Behind each respective cylindrical lens 82 there is also a photodetector 83. When a laser beam is incident on such a cylindrical lens 81 this image will in each case be projected as a linear image generally halfway up the cylindrical lens 81. Since the laser beam from the laser generator is deflected in a preset surface area or for example sweeps through 360° in order to define a reference plane, there will always be a sufficient light intensity at the photodetectors 83 arranged behind.

The signals received by the photodetectors 83 on one side of the datum plane 65 may be respectively fed to a common amplifier 85 so that as a function of the control signal occurring at the amplifier 85 for the upper coarse sensor range B or for the lower coarse sensor range B the second amplifier is turned on causing the respective drive 79 to be operated, for example via its control input 78, for raising or via its control input 80 for lowering.

It is naturally possible in this case as well for the two signals from the amplifiers 85 to be additionally fed to a comparator, although this is not basically necessary here, since the laser beam may be incident either only above or only under the center datum plane 65 in the coarse sensor range.

It is to be noted merely for the sake of completeness that the collecting lens 71 is shielded by an entire casing 87 and an upper cover 89 from the outside.

The lower half of the laser sensor 30 shown in FIG. 4 is identical to the plane 65 of symmetry 65, for which reason the two halves are connected by spacer members 91.

If for example a constructional machine is to be used to work a given slope area, it is possible for the attitude detector 2 of the sensor controlled leveling device to be set at this angle so that the laser sensor 30 mounted on the machine or mounted with reference to the plane 17 of the attitude detector 2 to be aligned at a suitable vertical attitude to the reference plane produced by a laser generator so that the machine having the sensor controlled leveling device may held precisely at the vertical attitude and height in relation to the reference plane as defined by the laser generator. Even if the constructional machine should travel over rough ground, the machine will be exactly held in the desired attitude via the sensor controlled leveling device by suitable deviation correction effected by the said servo drives. The alignment of a soil working machine in relation to a given horizontal or inclined plane by the attitude detector 2 is for example important for equipment as described in the U.S. Pat. No. 4,538,544.

In order to avoid overshooting the control range when the leveling device is actuated, for example on responding to roughness of the ground, it is possible to have a mechanically, magnetically or electrically operating damping device, which in the case of the attitude detector 2 is preferably mounted adjacent to the center support 3 and takes effect here.

Figure 7:
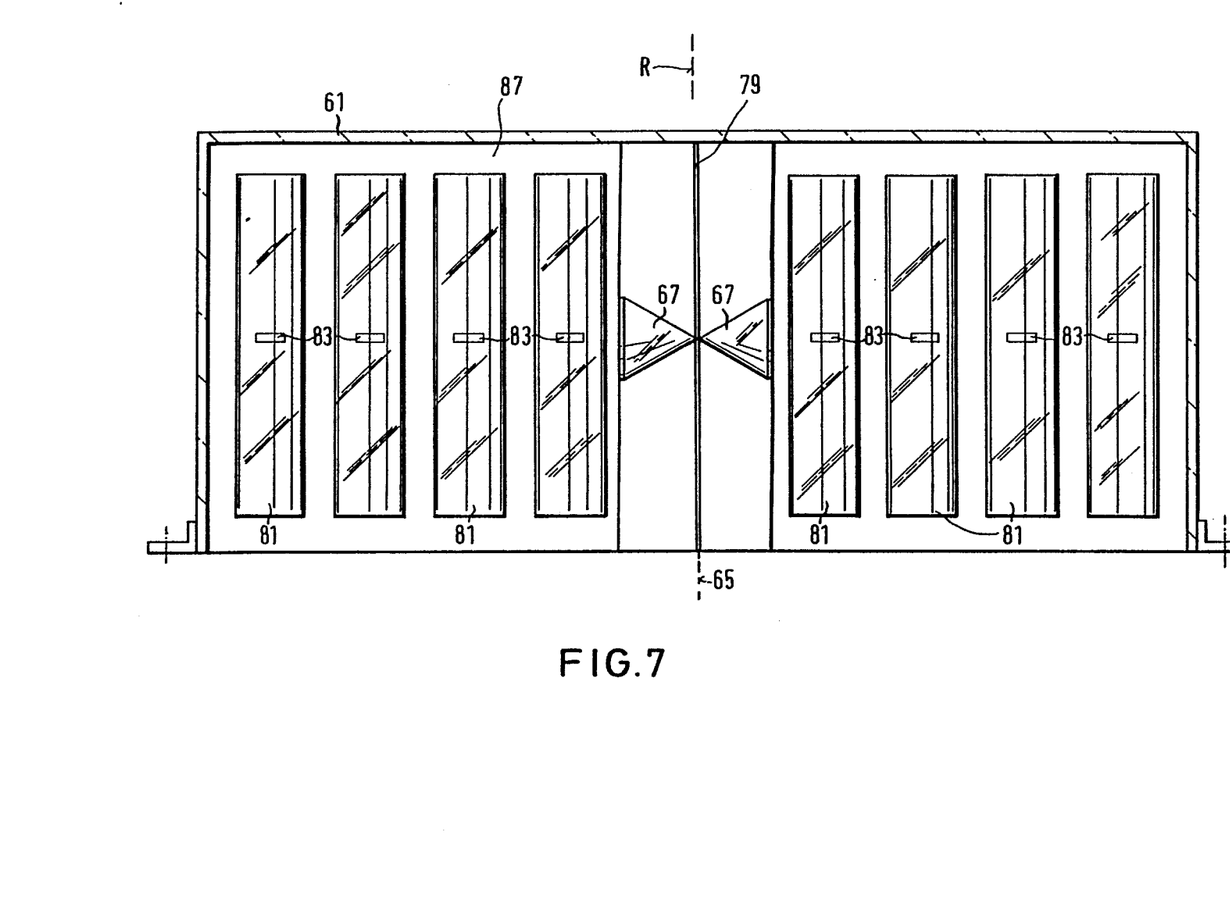
FIG. 7 shows a further possible form of a laser sensor.

Lastly, attention is called to FIG. 7 showing a modification of the laser sensor 30, which is of "sheet-like" or flat construction and comprises an unbroken housing part 87 in which the two converging conical or polygonal prisms 67 are arranged. They are adjoined by the prisms or concentrators 71 as explained with reference to FIG. 4 with the photodetectors 73 arranged at their ends.

The partly or fully cylindrical lenses 81 for defining a coarse sensor range B symmetrically on the two sides of the datum plane 65 are here only arranged on the laser sensor in a row awthwart the datum plane 65 so as to be parallel to one another and perpendicular to the datum plane 65. In each case there is a rear photodetector 83, which departing from the previously explained example of the invention, may also be placed with a parallel longitudinal alignment in relation to the individual partly or fully cylindrical rod lenses 81. This arrangement is more particularly suitable for instance if a soil working machine is to work the soil along a straight line. In this case a reference plane R is produced, for example by a laser generator, which is not horizontal but vertical, the laser sensor 30 being arranged in the horizontal attitude shown in FIG. 7 on the soil working machine.

As soon as the soil working machine deviates to the left or the right from the vertically defined reference plane, a correction shift is caused to take place, for example by causing the machine to be steered to the right or the left until the datum plane 65 is again fully aligned with the reference plane R. In this working example of the invention it is therefore not necessary to have a plurality of rows of lenses 81 placed adjacent to each other to form a more or less complete polygon since it is not necessary for the laser beam to be received from all directions.

It would obviously be possible for the fine sensor range A to be increased in size by the provision of conical or polygonal prisms 67 of suitable length. However the price of such components sharply increases with the axial length. On the other hand the use of a coarse sensor range B formed adjacent to the fine sensor range B in accordance with the design described is very much lower in price. Although precise measurement of the attitude is not possible with comparable accuracy, this is of no import, for as soon as the laser beam is in the coarse sensor range B, it is basically possible to detect the laser sensor that deviation correction is necessary. High resolution and high accuracy detection of the attitude is thus only needed in the direct vicinity of the actual datum plane 65 so that in this case there are only the conical or polygonal prisms 67, which despite the simplicity of the system make it possible to measure attitude with a very high degree of accuracy.

Departing from the working embodiment shown it is also possible to use cylindrical lenses, which are not in the form of full cylinders but only of semi- or part-cylinders with the cross section of a segment of a circle.

It is also possible to use lenses with an elliptical cross section and lenses with a polygonal form.

The forms of the invention, more particularly those with the attitude measuring means 2 and the laser sensor 30 as a common sensor controlled leveling device, may be modified by using the attitude detector 2 and also the laser sensor 30 as such alone as will be sufficient in many cases in order to achieve significant advantages in the work being performed.

In the drawings the cylindrical lenses 81 have a small distance from each other. This distance is generally smaller than the diameter of the laser beam as received by the laser sensor, such beam defining the reference plane. In this case the laser beam will be incident on at least one cylindrical lens 81. It is obviously possible for the cylindrical lenses to be in contact with each other so that there will be no gap between two adjacent cylindrical lenses.

We claim:

1. A sensor controlled leveling device comprising:
a laser sensor for detecting deviation of a datum plane defined by said sensor in relation to a reference plane swept by a laser beam;
processing electronic circuitry;
a servo drive adapted to respond to said circuitry and connected with said laser sensor to correct for any deviation of the attitude of the datum plane of the laser sensor relative to the reference plane to return the datum plane of the laser sensor toward the reference plane;
said laser sensor including two solid, conical or polygonal tapered light guides converging towards each other with each guide having a tip and a base, said tips lying in opposition to and directly adjacent one another and on opposite sides of the datum plane;

photodetectors disposed adjacent said light guide bases remote from the tips thereof for receiving light from said light guides and providing output signals of different magnitude in response thereto; and a comparator forming part of said processing circuitry for operating said drive in response to said output signals to locate said sensor such that the datum plane and reference plane are substantially coincident and the reference plane lies substantially centrally located between the two converging tips of the tapering light guides.

2. The sensor controlled leveling device according to claim 1, comprising respective collecting lenses at said bases of said guides, each of said lenses comprising a rearwardly tapering frustum, said photodetector being arranged at the rear face of each said frustum remote from the associated guide.

3. The sensor controlled leveling device according to claim 1, further comprising means defining a coarse sensor adjacent the first-mentioned sensor, said coarse sensor means including a plurality of at least in part cylindrically shaped lenses disposed at peripherally spaced locations about the axes of the tapered guides, a respective photodetector for each of said lenses connected to said electronic circuitry for operating said drive.

4. The sensor controlled leveling device according to claim 3, wherein only one said coarse sensor photodetector is arranged between each lens and said axes, said one photodetector having a comparatively small longitudinal extent in relation to the longitudinal extent of said lenses.

5. The sensor controlled leveling device according to claim 3, wherein the lenses are each so arranged in a number of rows parallel and adjacent to each other, as seen in axial plan view of the laser sensor as to form at least one generally complete polygonal form.

6. The sensor controlled leveling device according to claim 3, wherein said lenses are elongated and arranged such that their axes lie generally parallel to said datum plane and are spaced therefrom.

7. The sensor controlled leveling device according to claim 3, wherein said lenses are elongated, aligned transversely in relation to the datum plane, and in a parallel array adjacent to each other.

8. The sensor controlled leveling device according to claim 3, wherein at least said coarse sensor is surrounded by a gauze shield.

9. The sensor controlled leveling device according to claim 1, comprising a separating sheet in the datum plane between the two converging tapering guides to define a gap therebetween.

10. The sensor controlled leveling device according to claim 3, comprising respective collecting lenses at said bases of said guides, each of said lenses comprising a rearwardly tapering frustum, said photodetector being arranged at the rear face of each said frustum remote from the associated guide, an opaque shielded housing substantially surrounding said collecting lenses adjacent to the tapering guides, said collecting lenses and said shielded housing forming part of said coarse sensor and being disposed within the peripheral array of said cylindrically shaped lenses.

11. The sensor controlled leveling device according to claim 1, further comprising an attitude detector, including a container for a liquid, a float for disposition in the liquid, a servo drive for adjusting the attitude of the device, two pairs of contact means for detecting a change in attitude of said float and providing a signal and response thereto, means responsive to said signal for actuating said servo drive, said two pairs of contact means being so arranged on opposite end parts of said float such that one respective contact means of each contact pair is on said float and the other respective means of said pair is carried by said container, a center support for supporting said float in a center part thereof, said float being pivotally supported in the transverse direction in relation to the respective vertical plane extending through the two contact pairs, and at least one setting device connected to a contact of each pair thereof for achieving a pre-selectable inclined reference plane at a pre-selectable angular setting with respect to the horizontal.

12. The sensor controlled leveling device according to claim 11, including a setting beam pivotal about an axis, one contact means of each pair of said contact means being mounted on said beam for cooperation with the other contact means of said pair mounted on said float.

13. The sensor controlled leveling device according to claim 12, including at least four such contact means pairs arranged in the form of a cross for detecting the attitude of the float, said setting device being adapted to set the angle and comprising two pivot pins arranged perpendicular to each other, enabling the setting beam with the contact means arranged thereon in the form of a cross to be able to be set at a pre-selectable angle in relation to the reference plane.

14. The sensor controlled leveling device according to claim 1, wherein the output signals are of different magnitude in accordance with the intensity of laser light received by the guides, respectively, and the deviation of the datum and reference planes one from the other, said drive being operable in response to said output signals to displace the guides in a direction toward coincidence of said planes dependent upon the magnitude of the signal.

15. A sensor controlled leveling device according to claim 1, wherein each of said light guides is polygonal.

16. A sensor controlled leveling device according to claim 1, wherein each of said light guides is generally conical.

* * * * *